United States Patent
Oya

(10) Patent No.: US 11,605,855 B2
(45) Date of Patent: Mar. 14, 2023

(54) FUEL CELL SYSTEM AND METHOD FOR CONTROLLING FUEL CELL SYSTEM

(71) Applicant: TOYOTA JIDOSHA KABUSHIKI KAISHA, Toyota (JP)

(72) Inventor: Ryosuke Oya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/643,297

(22) Filed: Dec. 8, 2021

(65) Prior Publication Data

US 2022/0200085 A1 Jun. 23, 2022

(30) Foreign Application Priority Data

Dec. 21, 2020 (JP) .............................. JP2020-211335

(51) Int. Cl.
*H01M 16/00* (2006.01)
*B60L 58/40* (2019.01)
*H01M 8/04858* (2016.01)
*H01M 8/04537* (2016.01)

(52) U.S. Cl.
CPC ........... *H01M 16/006* (2013.01); *B60L 58/40* (2019.02); *H01M 8/0494* (2013.01); *H01M 8/04559* (2013.01); *H01M 8/04567* (2013.01); *H01M 8/04947* (2013.01); *H01M 2250/20* (2013.01)

(58) Field of Classification Search
CPC ......... H01M 8/04559; H01M 8/04567; H01M 8/0494; H01M 8/04947; H01M 16/006; B60L 58/40

USPC ........................................................ 429/432
See application file for complete search history.

(56) References Cited

U.S. PATENT DOCUMENTS

| | | | |
|---|---|---|---|
| 2017/0047603 A1* | 2/2017 | Kazuno | H01M 8/04888 |
| 2018/0290559 A1 | 10/2018 | Oya | |
| 2019/0067718 A1* | 2/2019 | Saito | H01M 8/04559 |
| 2019/0152330 A1* | 5/2019 | Lee | B60L 3/0046 |

(Continued)

FOREIGN PATENT DOCUMENTS

JP 2018181834 A 11/2018

*Primary Examiner* — James M Erwin
(74) *Attorney, Agent, or Firm* — Hunton Andrews Kurth LLP

(57) ABSTRACT

A fuel cell system includes: a fuel cell; a fuel cell step-up converter having an input terminal, wherein the input terminal is connected to the fuel cell; a secondary cell; a secondary cell step-up converter having an input terminal an output terminal, wherein the input terminal is connected to the secondary cell. wherein the output terminal is connected to an output terminal of the fuel cell step-up converter; and a control device configured to control at least the fuel cell step-up converter and the secondary cell step-up converter to control the fuel cell system, wherein, the control device executes interruption control when the control device executes continuity control and an output of the fuel cell system is requested to be greater than an output of the secondary cell in the continuity control, wherein the continuity control is a control to control the secondary cell step-up converter to output an input voltage from the secondary cell without stepping up the input voltage, wherein the interruption control is a control to interrupt an electrical connection between the fuel cell system and the secondary cell.

5 Claims, 3 Drawing Sheets

(56) References Cited

U.S. PATENT DOCUMENTS

2020/0220184 A1\* 7/2020 Shimada ................. B60L 58/25
2020/0227761 A1\* 7/2020 Yoshida ................. B60L 58/20

\* cited by examiner

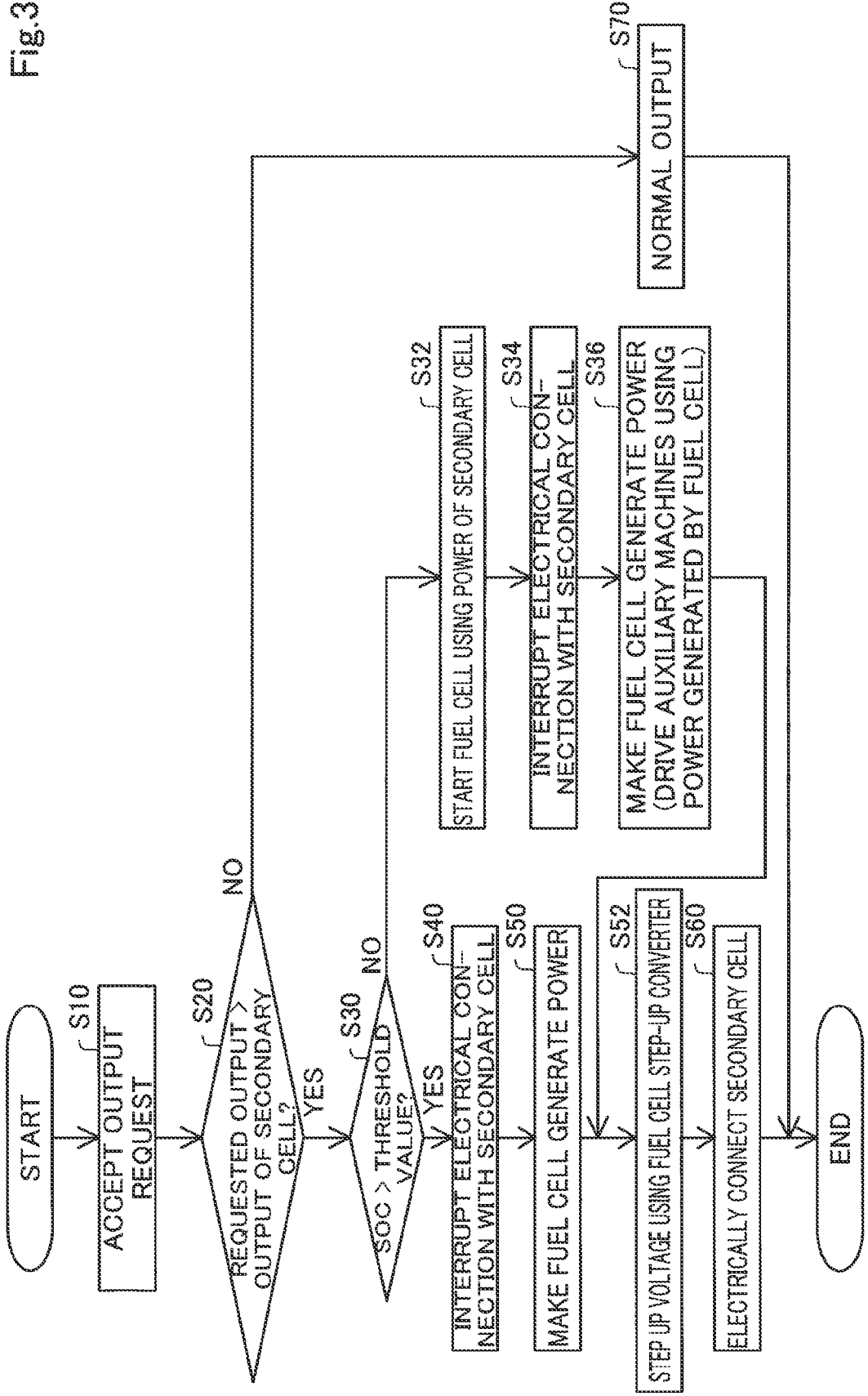

FUEL CELL SYSTEM AND METHOD FOR CONTROLLING FUEL CELL SYSTEM

CROSS REFERENCE TO RELATED APPLICATIONS

This application is based upon and claims the benefit of priority from Japanese Patent Application No. 2020-211335, filed Dec. 21, 2020, the entire contents of which are incorporated herein by reference.

BACKGROUND

Field

The present disclosure relates to a fuel cell system and a method for controlling the fuel cell system.

Related Art

A fuel cell system including a fuel cell step-up converter that steps up the output voltage of a fuel cell and a secondary cell step-up converter that steps up the output voltage of a secondary cell is known (Japanese Patent Application Publication No. 2018-181834, for example). In this fuel cell system, when the secondary cell step-up converter has broken down and is unable to step up the voltage of the secondary cell, control is performed such that the output voltage from the fuel cell is lower than the output-side voltage of the secondary cell step-up converter, whereby power is supplied to a load from the fuel cell.

In a state in which the secondary cell step-up converter has broken down and is unable to step up the voltage, the output voltage of the fuel cell becomes lower than the output voltage that is obtained under normal conditions, which sometimes makes it impossible for a user to obtain a desired output.

SUMMARY

According to one aspect of the present disclosure, a fuel cell system is provided. The fuel cell system includes: a fuel cell; a fuel cell step-up converter having an input terminal, wherein the input terminal is connected to the fuel cell; a secondary cell; a secondary cell step-up converter having an input terminal an output terminal, wherein the input terminal is connected to the secondary cell. wherein the output terminal is connected to an output terminal of the fuel cell step-up converter; and a control device configured to control at least the fuel cell step-up converter and the secondary cell step-up converter to control the fuel cell system, wherein, the control device executes interruption control when the control device executes continuity control and an output of the fuel cell system is requested to be greater than an output of the secondary cell in the continuity control, wherein the continuity control is a control to control the secondary cell step-up converter to output an input voltage from the secondary cell without stepping up the input voltage, wherein the interruption control is a control to interrupt an electrical connection between the fuel cell system and the secondary cell. In the fuel cell system of this aspect, during the continuity control, by executing the interruption control by which an electrical connection between the secondary cell and the fuel cell system is interrupted, it is possible to step up the output voltage from the fuel cell to an output voltage higher than the output voltage of the secondary cell in the continuity control in which the interruption control is not executed. This makes it possible for a user to obtain a desired output even when an output requested by the user is higher than the output of the secondary cell during the execution of the continuity control.

BRIEF DESCRIPTION OF THE DRAWINGS

FIG. 3 is a flowchart showing a method for controlling the fuel cell system as a second embodiment.

DETAILED DESCRIPTION

A. First Embodiment

Figure 1:
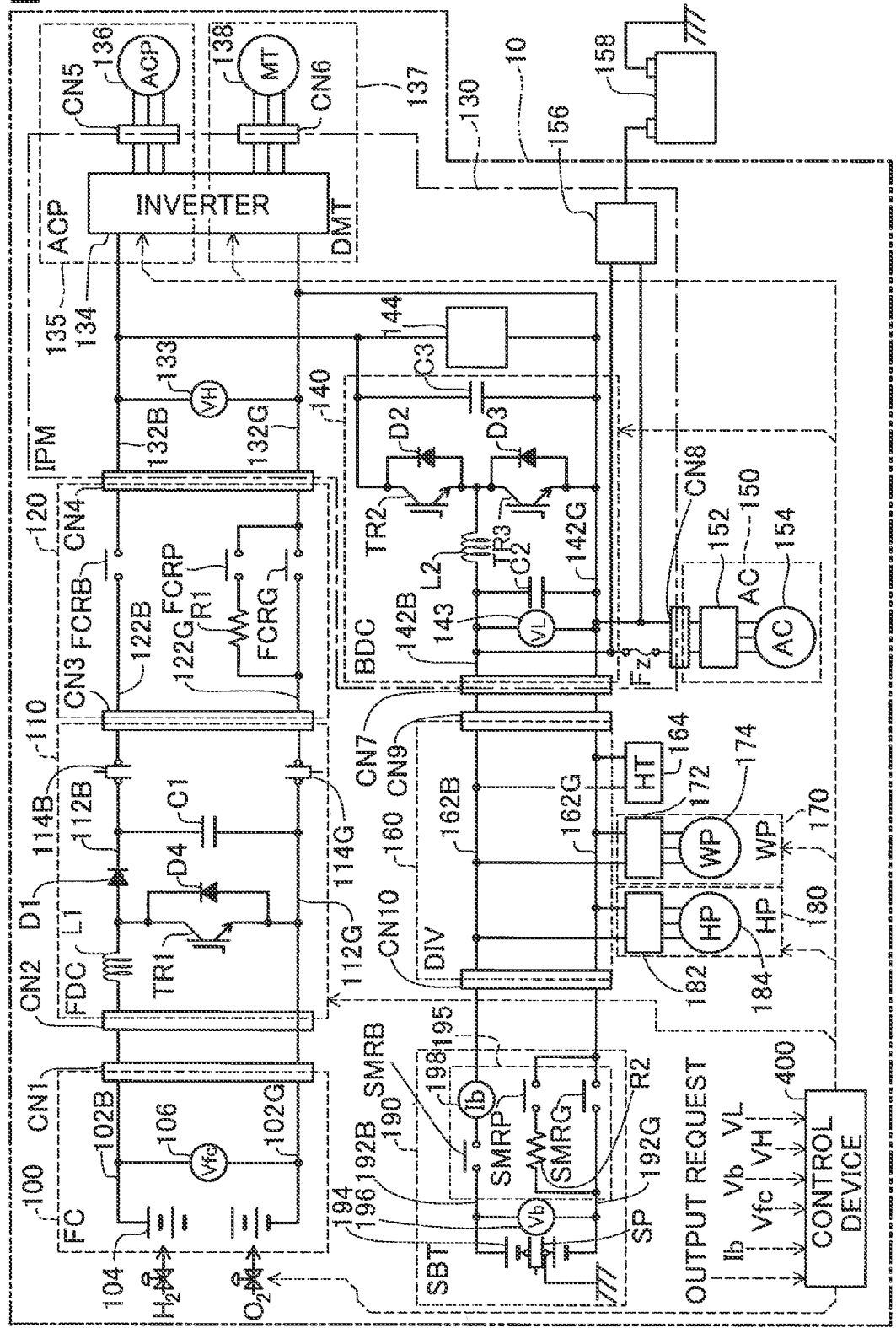
FIG. 1 is an explanatory diagram showing the schematic configuration of a fuel cell system.

FIG. 1 is an explanatory diagram showing the schematic configuration of a fuel cell system 10. The fuel cell system 10 is installed in, for example, a fuel-cell vehicle using a fuel cell as a drive source. The fuel cell system 10 includes a fuel cell unit 100, a fuel-cell step-up converter unit 110 (hereinafter also referred to as an "fuel cell step-up converter 110"), a fuel cell relay unit 120 (hereinafter also referred to as an "fuel cell relay 120"), an intelligent power module unit 130 (hereinafter also referred to as an "IPM 130"), an air conditioner unit 150, a branch unit 160, a water pump unit 170, a hydrogen pump unit 180, a secondary cell unit 190, and a control device 400. The IPM 130 includes an air compressor unit 135, a drive motor unit 137, and a DC-DC converter unit 140 (hereinafter also referred to as a "secondary cell step-up converter 140"). The fuel cell system 10 may be used in a household power source, stationary power generation, and the like in addition to the fuel-cell vehicle.

The fuel cell step-up converter 110 steps up the output voltage of a fuel cell 104 to the drive voltage of the air compressor unit 135 and the drive motor unit 137. The input terminal of the fuel cell step-up converter 110 is connected to the fuel cell unit 100, and the output terminal of the fuel cell step-up converter 110 is connected to the IPM 130 via the fuel cell relay 120. The air conditioner unit 150 and the branch unit 160 are connected to the IPM 130. The water pump unit 170, the hydrogen pump unit 180, and the secondary cell unit 190 are connected to the branch unit 160.

The fuel cell unit 100 includes high-voltage interconnections 102B and 102G, the fuel cell 104, a voltage sensor 106, and a connector CN1. "B" at the end of a reference sign "102B" of the high-voltage interconnection 102B means a plus side, and "G" at the end of a reference sign "102G" of the high-voltage interconnection 102G means a minus side. The meaning of "B" and "G" at the ends of reference signs apply to reference signs of other interconnections and relays which will be described later. The fuel cell 104 is a solid polymer electrolyte fuel cell that generates power by being supplied with hydrogen gas and air as reaction gas. The fuel cell 104 has a stack structure in which a plurality of fuel cells, each having a membrane electrode assembly (MEA) configured with an electrolyte membrane and two electrodes, an anode and a cathode, joined to both sides of the electrolyte membrane, are stacked. The fuel cell 104 is not limited to a solid polymer electrolyte fuel cell and may be various types of fuel cells such as a phosphoric-acid fuel cell, a molten carbonate fuel cell, and a solid-oxide fuel cell. The voltage sensor 106 obtains a voltage Vfc which is output from the fuel cell 104. The output of the fuel cell 104 is output to the fuel cell step-up converter 110 via the connector CN1.

The fuel cell step-up converter 110 includes high-voltage interconnections 112B and 112G, service plugs 114B and 114G, a reactor L1, a switching transistor TR1, diodes D1 and D4, a smoothing capacitor C1, an input terminal connector CN2, and an output terminal connector CN3. One terminal of the reactor L1 is connected to the plus side of the input terminal connector CN2, and the other terminal of the reactor L1 is connected to the anode of the diode D1. The cathode of the diode D1 is connected to the plus-side service plug 114B via the high-voltage interconnection 112B. The minus side of the input terminal connector CN2 is connected to the minus-side service plug 114G via the high-voltage interconnection 112G. The switching transistor TR1 is provided between the anode of the diode D1 and the high-voltage interconnection 112G. The diode D4 is provided in parallel with the switching transistor TR1. The fuel cell step-up converter 110 steps up the voltage input from the input terminal connector CN2 by the ON/OFF of the switching transistor TR1 and outputs the voltage from the output terminal connector CN3.

The fuel cell relay 120 includes high-voltage interconnections 122B and 122G, a plus-side contact (hereinafter also referred to as an "fuel cell relay FCRB"), a minus-side contact (hereinafter also referred to as an "fuel cell relay FCRG"), a precharge contact (hereinafter also referred to as a "precharge relay FCRP"), and a resistor R1. The plus-side fuel cell relay FCRB is provided in the plus-side high-voltage interconnection 122B, and the minus-side fuel cell relay FCRG is provided in the minus-side high-voltage interconnection 122G. The precharge relay FCRP and the resistor R1 are connected in series and provided in parallel with the minus-side fuel cell relay FCRG. The precharge relay FCRP is turned on before the fuel cell relay FCRG is turned on, which allows only a current limited by the resistor R1 to flow through the precharge relay FCRP and thereby makes it possible to reduce the possibility that the precharge relay FCRP is fused when it is turned on or prevent the precharge relay FCRP from being fused when it is turned on. The fuel cell relay FCRG is turned on after a difference between the voltages on both sides of the fuel cell relay FCRG is reduced, which does not allow a large arc current to flow when the fuel cell relay FCRG is turned on. This makes it possible to reduce the possibility that the fuel cell relay FCRG is fused or prevent the fuel cell relay FCRG from being fused.

The IPM 130 includes high-voltage interconnections 132B, 132G, 142B, and 142G, an inverter 134, the secondary cell step-up converter 140, a discharge mechanism 144, voltage sensors 133 and 143, and connectors CN4 to CN7. The inverter 134 includes a two-system H-bridge circuit, and converts direct-current power, which is supplied to the high-voltage interconnections 132B and 132G, to two three-phase alternating currents and outputs the currents to the connectors CN5 and CN6. An air compressor 136 and a drive motor 138 are connected to the connectors CN5 and CN6, respectively. The air compressor 136 supplies air to the cathode of the fuel cell 104. The drive motor 138 drives a driving wheel of the fuel-cell vehicle. The drive motor 138 functions as a regenerative motor when the speed of the fuel-cell vehicle is reduced. One system of H-bridge circuit of the inverter 134, the connector CN5, and the air compressor 136 make up the air compressor unit 135, and the other system of H-bridge circuit of the inverter 134, the connector CN6, and the drive motor 138 make up the drive motor unit 137.

The secondary cell step-up converter 140 is a bidirectional DC-DC converter that is able to step down the voltage input to the high-voltage interconnections 132B and 132G from the connector CN4 and output the voltage thus obtained to the connector CN7 and is able to step up the voltage input to the connector CN7 and output the voltage thus obtained to the high-voltage interconnections 132B and 132G. The secondary cell step-up converter 140 includes the high-voltage interconnections 142B and 142G, a reactor L2, switching transistors TR2 and TR3, diodes D2 and D3, and smoothing capacitors C2 and C3. The switching transistors TR2 and TR3 are provided in series between the plus-side high-voltage interconnection 132B and the minus-side high-voltage interconnection 132G. The switching transistors TR2 and TR3 are each an aspect of a switching element that is used when interruption control, which will be described later, is executed. The diode D2 is provided in parallel with the switching transistor TR2, and the diode D3 is provided in parallel with the switching transistor TR3. The reactor L2 is provided between an intermediate node between the switching transistor TR2 and the switching transistor TR3 and the plus-side high-voltage interconnection 142B. The high-voltage interconnection 142B is connected to the plus side of the connector CN7, and the high-voltage interconnection 142G is connected to the minus side of the connector CN7. The high-voltage interconnection 142B is electrically connected to the plus-side high-voltage interconnection 132B, and the high-voltage interconnection 142B and the plus-side high-voltage interconnection 132B are at the same potential. The high-voltage interconnection 142G is electrically connected to the minus-side high-voltage interconnection 132G, and the high-voltage interconnection 142G and the minus-side high-voltage interconnection 132G are at the same potential. The smoothing capacitor C2 is provided between the plus-side high-voltage interconnection 142B and the minus-side high-voltage interconnection 142G. The smoothing capacitor C3 is provided between the plus-side high-voltage interconnection 132B and the minus-side high-voltage interconnection 132G. The voltage sensor 133 obtains a voltage VH between the high-voltage interconnection 132B and the high-voltage interconnection 132G. The voltage sensor 143 obtains a voltage VL between the high-voltage interconnection 142B and the high-voltage interconnection 142G.

The discharge mechanism 144 consumes regenerative power. When the speed of the fuel-cell vehicle is reduced, the drive motor 138 functions as a regenerative motor, and regenerates power and applies a regenerative brake. A secondary cell 194 is charged with the regenerative power. When the secondary cell 194 is fully charged, it becomes impossible to charge the secondary cell 194, which makes it impossible to apply the regenerative brake by the drive motor 138. When the secondary cell 194 is fully charged, the discharge mechanism 144 consumes the regenerative power and thereby makes the drive motor 138 function as the regenerative brake.

The air conditioner unit 150 includes an inverter 152, an air conditioner 154, and a connector CN8. The air conditioner 154 performs air conditioning in the fuel-cell vehicle. The connector CN8 is connected to the high-voltage interconnections 142B and 142G of the IPM 130. A fuse Fz is provided between the connector CN8 and the high-voltage interconnection 142B.

A step-down converter 156 is connected to the high-voltage interconnections 142B and 142G of the IPM 130. A lead-acid battery 158 is connected to the step-down converter 156. The step-down converter 156 steps down the voltage of the high-voltage interconnections 142B and 142G to a voltage of the lead-acid battery 158 and supplies the voltage to the lead-acid battery 158. The lead-acid battery 158 is used as a power source of the control device 400 and low-voltage auxiliary machines of the fuel-cell vehicle, such as a winker, a headlight, a wiper, and a power window.

The branch unit 160 is a device that distributes the power supplied to a connector CN9 or a connector CN10. The branch unit 160 includes high-voltage interconnections 162B and 162G and the connectors CN9 and CN10. A heater 164, the water pump unit 170, and the hydrogen pump unit 180 are connected to the branch unit 160. The water pump unit 170 and the hydrogen pump unit 180 are auxiliary machines which are used for power generation by the fuel cell 104. The water pump unit 170 includes an inverter 172 and a water pump 174. The water pump 174 circulates coolant which is supplied to the fuel cell 104. A part of the coolant which is supplied to the fuel cell 104 is branched from a cooling flow path, and is heated by the heater 164 and used for heating of the fuel-cell vehicle. The hydrogen pump unit 180 includes an inverter 182 and a hydrogen pump 184. The hydrogen pump 184 circulates, to the fuel cell 104, hydrogen in the exhaust gas discharged from the fuel cell 104.

The secondary cell unit 190 includes high-voltage interconnections 192B and 192G, the secondary cell 194, a system main relay 195, a voltage sensor 196, a current sensor 198, and a service plug SP. The secondary cell 194 is a high-voltage secondary cell having an output voltage of 200 to 400 V, for example. Together with the fuel cell 104, the secondary cell 194 functions as a power source of the air compressor 136 and the drive motor 138. For example, a nickel-hydrogen cell, a lithium-ion cell, or the like may be used as the secondary cell 194.

The voltage sensor 196 obtains a voltage Vb which is output from the secondary cell 194. The current sensor 198 obtains an output current Ib which is output from the secondary cell 194. The system main relay 195 includes a plus-side contact (hereinafter also referred to as a "system main relay SMRB"), a minus-side contact (hereinafter also referred to as a "system main relay SMRG"), a precharge contact (hereinafter also referred to as a "precharge relay SMRP"), and a resistor R2. The plus-side system main relay SMRB is provided in the plus-side high-voltage interconnection 192B, and the minus-side system main relay SMRG is provided in the minus-side high-voltage interconnection 192G. The precharge relay SMRP and the resistor R2 are connected in series and provided in parallel with the minus-side system main relay SMRG. The service plug SP is provided in the secondary cell 194. The high-voltage interconnections 142B, 162B, and 192B between the secondary cell step-up converter 140 and the secondary cell 194 are at the same potential, and the high-voltage interconnections 142G, 162G, and 192G between the secondary cell step-up converter 140 and the secondary cell 194 are at the same potential.

The control device 400 includes a microprocessor and a memory, and controls the operations of the portions of the fuel cell system 10 including the operations of the fuel cell step-up converter 110 and the secondary cell step-up converter 140. The operations of the portions of the fuel cell system 10 include obtaining the voltage Vfc of the fuel cell 104, the voltage Vb of the secondary cell 194, and the voltages VH and VL on both sides of the secondary cell step-up converter 140, the operations of the switching transistors TR1 to TR3 of the fuel cell step-up converter 110 and the secondary cell step-up converter 140, the operations of the inverters 134, 182, and 172, and the like. When an FDC controller that controls the operation of the fuel cell step-up converter 110, a BAT controller that controls the operation of the secondary cell 194, and a BDC controller that controls the operation of the secondary cell step-up converter 140 are provided, the control device 400 may obtain the voltage Vfc from the voltage sensor 106 via the FDC controller, obtain the voltage Vb from the voltage sensor 196 via the BAT controller, and obtain the voltages VH and VL from the voltage sensors 133 and 143, respectively, via the BDC controller. The BDC controller may include an MG controller that controls the drive motor 138 or the inverter 134 of the drive motor 138.

Figure 2:
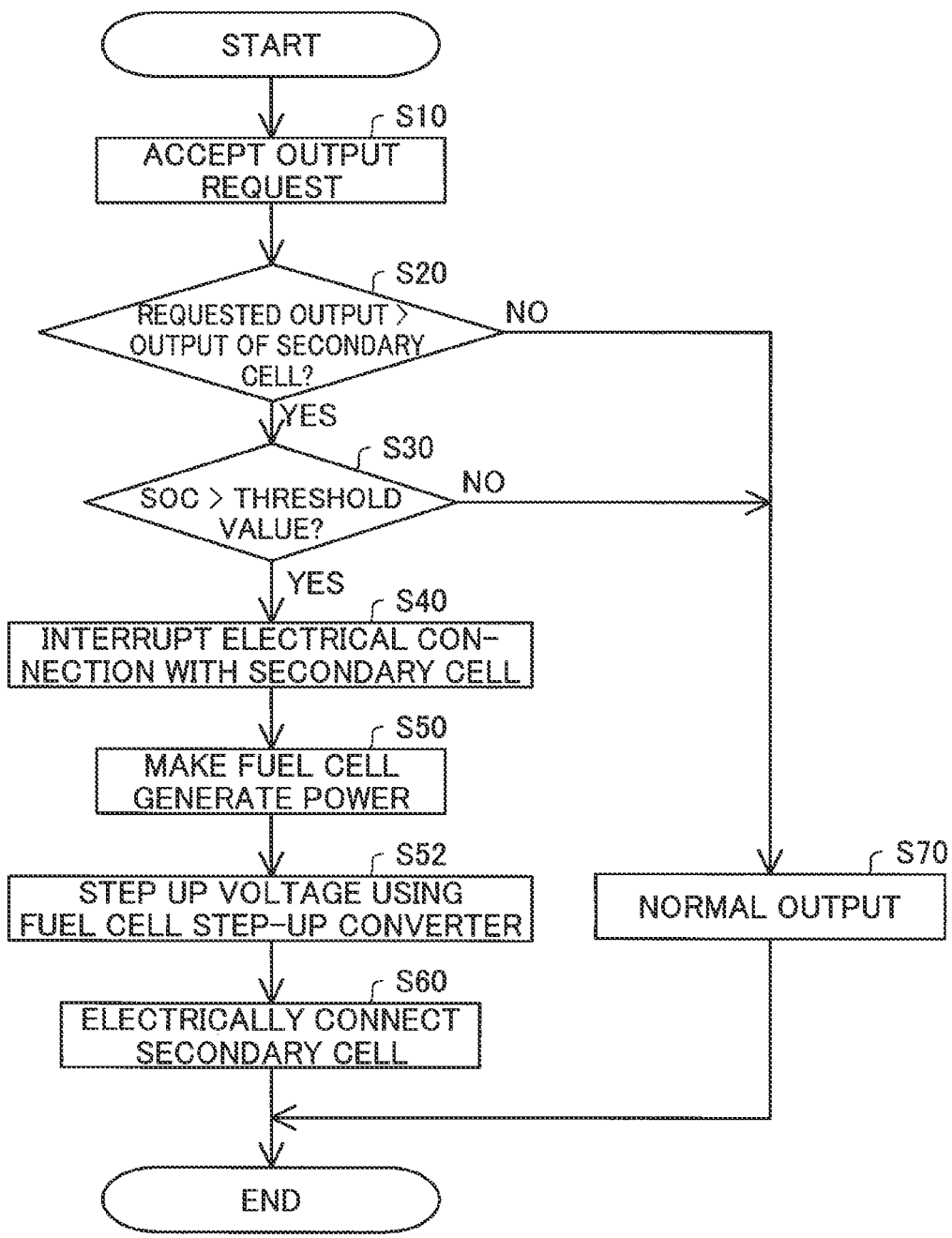
FIG. 2 is a flowchart showing a method for controlling the fuel cell system.

FIG. 2 is a flowchart showing a method for controlling the fuel cell system 10, which is performed by the control device 400. This flow is started in response to, for example, continuity control executed by the secondary cell step-up converter 140 due to a breakdown of the secondary cell step-up converter 140. This flow may be repeatedly performed once every predetermined period such as a few seconds or a few milliseconds, for example. A "breakdown of the secondary cell step-up converter 140" means a state in which, when the secondary cell step-up converter 140 performs a step-up operation using, as an input terminal, the terminal thereof where the connector CN7 is located, the secondary cell step-up converter 140 is unable to step up the input-side voltage VL such that the output-side voltage VH becomes a predetermined value or more. A breakdown of the secondary cell step-up converter 140 includes, for example, a state in which the control device 400 is unable to obtain the voltage VH or VL due to, for example, a breakdown of the voltage sensor 133 or the voltage sensor 143, a state in which it is impossible to perform the operation of a switching element for generating a predetermined duty ratio, and connection anomaly of the high-voltage interconnections 142B, 162B, 192B, 142G, 162G, and 192G, and does not include a state in which it is impossible to execute on-off control of the switching elements such as the switching transistors TR2 and TR3. The control device 400 monitors the voltages VH and VL on both sides of the secondary cell step-up converter 140 by using the voltage sensors 133 and 143. The control device 400 determines that the secondary cell step-up converter 140 has broken down if the control device 400 determines that, even when the step-up operation of turning on and off the switching transistor TR3 of the secondary cell step-up converter 140 is performed, the output-side voltage VH does not become a voltage higher than or equal to a predetermined voltage, that is, does not become a voltage obtained by sufficiently stepping up the input-side voltage VL. The "continuity control of the secondary cell step-up converter 140" means energization control which is executed by the control device 400 at the time of a breakdown of the secondary cell step-up converter 140. In the present embodiment, as the continuity control, control is executed such that the switching transistor TR2 of the secondary cell step-up converter 140 is locked in ON and the switching transistor TR3 of the secondary cell step-up converter 140 is locked in OFF. As a result, the voltage Vb which is output from the secondary cell 194, the voltage VL which is input to the secondary cell step-up converter 140, and the voltage VH which is output from the secondary cell step-up converter 140 become nearly equal to one another. The control device 400 may execute the continuity control of the secondary cell step-up converter 140 and, at the same time, notify the user or administrator of the fuel cell system 10, such as a driver of the fuel-cell vehicle, that there is an abnormality in the secondary cell step-up converter 140 or the user or administrator should perform evacuation traveling of the fuel-cell vehicle.

In Step S10, the control device 400 accepts an output request from the user of the fuel cell system 10. The output request from the user includes, for example, an accelerator position of the fuel-cell vehicle obtained from an unillustrated accelerator position sensor, a requested torque of the drive motor 138 which is calculated from the accelerator position, and output power to the drive motor 138 which is necessary to output the requested torque of the drive motor 138. In the present embodiment, the control device 400 obtains output power to the drive motor 138, which was separately computed by an unillustrated ECU or the like, as the output request from the user. The control device 400 may obtain an accelerator position of the fuel-cell vehicle or a requested torque of the drive motor 138 and compute output power to the drive motor 138.

In Step S20, the control device 400 determines whether or not the output requested by the user is greater than the output of the secondary cell 194 in the continuity control. The output of the secondary cell 194 in the continuity control is, for example, a power value obtained by multiplying the voltage VL, the voltage VH, or the voltage Vb in the continuity control by an allowable current of each interconnection such as the high-voltage interconnection 142B, 162B, 192B, 142G, 162G, or 192G. If the output requested by the user is greater than the output of the secondary cell 194 (S20: YES), the control device 400 proceeds to Step S30. If the output requested by the user is less than or equal to the output of the secondary cell 194 (S20: NO), the control device 400 proceeds to Step S70.

In Step S70, the control device 400 controls the portions of the fuel cell system 10 and outputs a normal output in the continuity control, that is, power which is obtained by multiplying the output voltage of the secondary cell 194 by an allowable current of each interconnection. The continuity control in Step S70 allows the secondary cell 194 to be charged with the regenerative power from the drive motor 138 and the output power from the fuel cell 104. Moreover, in Step S70, when it is possible to ensure the step-up ratio of the fuel cell step-up converter 110, the control device 400 may step up the output voltage from the fuel cell 104 and output the voltage. The step-up ratio of the fuel cell step-up converter 110 means (the output voltage of the fuel cell step-up converter 110)/(the input voltage of the fuel cell step-up converter 110). In the continuity control, since the output voltage of the fuel cell step-up converter 110 is nearly equal to the voltage VH and is also nearly equal to the voltage Vb, the control device 400 may use the calculation result of Vb/Vfc in place of the step-up ratio of the fuel cell step-up converter 110 in the continuity control. When it is possible to ensure the step-up ratio, the on-off control of the switching transistor TR1 of the fuel cell step-up converter 110 makes it possible to lower the input-side voltage of the fuel cell step-up converter 110, which allows power to be supplied to the output terminal of the fuel cell step-up converter 110. This makes it possible to step up the output voltage of the fuel cell 104 and use the power of the fuel cell 104 to make the vehicle travel.

In Step S30, the control device 400 compares the remaining capacity of the secondary cell 194 with a threshold value. The remaining capacity of the secondary cell 194 means the proportion of the quantity of electricity remaining after subtraction of the quantity of discharged electricity from a full charge capacity at which the secondary cell 194 is fully charged (hereinafter also referred to as a "state of charge (SOC)"). The control device 400 calculates the SOC of the secondary cell 194 using, for example, the output current Ib of the secondary cell 194 detected by the current sensor 198. In place of a comparison of the proportion of the quantity of remaining electricity of the secondary cell 194 and the threshold value, the control device 400 may compare the quantity of remaining electricity of the secondary cell 194 with a predetermined threshold value. An SOC detection method is not limited to a method for calculating an SOC using the output current Ib of the secondary cell 194; an SOC may be calculated using the voltage Vb which is obtained from the voltage sensor 196, an SOC may be calculated based on an electrolyte specific gravity sensor, a cell voltage sensor, a battery terminal voltage sensor, or the like of the secondary cell 194, and a charged state may be detected using other parameters such as a possible charge quantity. The threshold value which is used in Step S30 means a threshold value which is set to avoid a breakdown of the secondary cell 194, and is a lower limit for an SOC at which discharge of the secondary cell 194 is permitted. From the viewpoint of reliably avoiding a breakdown of the secondary cell 194, it is preferable that the threshold value is sufficiently greater than an SOC in which a breakdown may occur in the secondary cell 194. If the remaining capacity of the secondary cell 194 is less than or equal to the threshold value (S30: NO), the control device 400 proceeds to Step S70; if the remaining capacity of the secondary cell 194 is greater than the threshold value (S30: YES), the control device 400 proceeds to Step S40.

In Step S40, the control device 400 executes the interruption control by which an electrical connection between the fuel cell system 10 and the secondary cell 194 is interrupted. In the present embodiment, in addition to the switching transistor TR3 of the secondary cell step-up converter 140 which was already turned off by the continuity control, the control device 400 turns off the switching transistor TR2 as the interruption control. As a result, an electrical connection between the secondary cell unit 190, the hydrogen pump unit 180, the water pump unit 170, and the like and the fuel cell system 10 is interrupted. By the interruption control, the supply of power to the air compressor 136 and the drive motor 138 from the secondary cell 194 is stopped and charging of the secondary cell 194 by the regenerative power or the output power from the fuel cell 104 is stopped.

In Step S50, the control device 400 makes the fuel cell 104 generate power. More specifically, the control device 400 makes the fuel cell 104 generate power by driving the air compressor 136 and the auxiliary machines and supplying fuel gas and air to the fuel cell 104. The water pump unit 170 and the hydrogen pump unit 180, which are the auxiliary machines that are used in power generation by the fuel cell 104, are started and driven using the output power from the secondary cell 194.

In Step S52, the control device 400 executes the on-off control of the switching transistor TR1 of the fuel cell step-up converter 110 and steps up the voltage Vfc, which is output from the fuel cell 104, to a voltage corresponding to the output requested by the user. As a result, the voltage corresponding to the output requested by the user is output from the fuel cell step-up converter 110. In the continuity control, when the output voltage from the fuel cell step-up converter 110 is made higher than the output voltage of the secondary cell 194 in the continuity control without the execution of the interruption control, the output power from the fuel cell 104 is supplied to the secondary cell 194. On the other hand, in Step S52, since an electrical connection between the secondary cell 194 and the fuel cell system 10 is interrupted, it is possible to step up the output voltage from the fuel cell 104 to an output voltage higher than the output of the secondary cell 194 in normal continuity control in which the interruption control is not executed. When a predetermined period has elapsed after the start of the supply of power from the fuel cell 104, the control device 400 determines that a condition for ending Step S52 is satisfied and proceeds to Step S60. In addition to a lapse of a predetermined period, the condition for ending Step S52 may be, for example, a case where the SOC of the secondary cell 194 becomes a threshold value or less or a case where the output requested by the user is changed to an output less than or equal to the output of the secondary cell 194.

In Step S60, the control device 400 ends the interruption control by switching the switching transistor TR2 to ON, proceeds to the normal continuity control, and ends the processing. As a result, the secondary cell unit 190 and the like are electrically connected to the fuel cell system 10 again.

As described above, in the fuel cell system 10 of the present embodiment, during the execution of the continuity control by which the secondary cell step-up converter 140 is made to output the input voltage from the secondary cell 194 without stepping up the input voltage, if an output request from the user is greater than the output of the secondary cell 194, the control device 400 executes the interruption control by which an electrical connection between the fuel cell system 10 and the secondary cell 194 is interrupted. The fuel cell system 10 of the present embodiment executes the interruption control during the continuity control, which makes it possible for the fuel cell system 10 to step up the output voltage from the fuel cell 104 to an output voltage higher than the output voltage of the secondary cell 194 in the normal continuity control in which the interruption control is not executed. This makes it possible for the user to obtain a desired output even when, during the execution of the continuity control based on a breakdown of the secondary cell step-up converter 140, an output requested by the user is higher than the output of the secondary cell 194 in the normal continuity control.

In the fuel cell system 10 of the present embodiment, the control device 400 does not execute the interruption control if the remaining capacity of the secondary cell 194 is less than or equal to a predetermined threshold value. When the SOC of the secondary cell 194 is low, the fuel cell system 10 of the present embodiment gives a higher priority, than to output of a high voltage by the interruption control, to the normal continuity control that allows the supply of regenerative power to the secondary cell 194 and charging by the output power from the fuel cell 104 to be performed. This makes it possible to reduce the possibility that the remaining capacity of the secondary cell 194 is excessively lowered or prevent the remaining capacity of the secondary cell 194 from being excessively lowered and reduce the possibility that the secondary cell 194 breaks down or prevent the secondary cell 194 from breaking down.

In the fuel cell system 10 of the present embodiment, the control device 400 interrupts an electrical connection between the fuel cell system 10 and the secondary cell 194 by OFF control of the switching transistor TR2 of the secondary cell step-up converter 140 in the interruption control. This makes it possible to execute the interruption control by simple control using an existing configuration of the secondary cell step-up converter 140.

B. Second Embodiment

FIG. 3 is a flowchart showing a method for controlling the fuel cell system 10 as a second embodiment of the present disclosure. The method for controlling the fuel cell system 10 of the second embodiment differs from the method for controlling the fuel cell system 10 of the first embodiment in that Steps S32 to S36 are performed in place of Step S70 if the SOC of the secondary cell 194 is less than or equal to the threshold value in Step S30. Moreover, in the fuel cell system 10 of the first embodiment, power is supplied to the hydrogen pump unit 180 and the water pump unit 170 as the auxiliary machines only from the secondary cell 194 during the execution of the interruption control. On the other hand, the fuel cell system 10 of the second embodiment differs from the fuel cell system 10 of the first embodiment in that power is supplied to the hydrogen pump unit 180 and the water pump unit 170 also from the fuel cell 104 in addition to the secondary cell 194. It is possible to implement the supply of power to the hydrogen pump unit 180 and the water pump unit 170 from the fuel cell 104 during the execution of the interruption control by, for example, electrically connecting the fuel cell unit 100 and the hydrogen pump unit 180 and the water pump unit 170 via a relay circuit, a high-voltage interconnection having a switching element, and the like. The other configurations of the fuel cell system 10 of the second embodiment are similar to the configurations of the fuel cell system 10 of the first embodiment. Since Steps S10 to S50 and Step S70 are similar to those of the first embodiment, explanations thereof are omitted.

In Step S32, the control device 400 starts the fuel cell 104 by starting the air compressor 136 and the hydrogen pump 184 and the water pump 174 as the auxiliary machines using the power of the secondary cell 194. When the fuel cell 104 has already been started, Step S32 may be omitted. In Step S34, the control device 400 executes the interruption control by which an electrical connection between the fuel cell system 10 and the secondary cell 194 is interrupted. Unlike the interruption control in Step S40 described in the first embodiment, in the interruption control in Step S34, an electrical connection between the fuel cell system 10 and the secondary cell 194 is interrupted by turning off the system main relay 195 of the secondary cell unit 190. As a result, an electrical connection between the secondary cell unit 190 and the fuel cell system 10 is interrupted and an electrical connection between the secondary cell unit 190 and the hydrogen pump 184 and the water pump 174 as the auxiliary machines is interrupted. The control device 400 may further turn off the switching transistor TR2 of the secondary cell step-up converter 140.

In Step S36, the control device 400 performs power generation by the fuel cell 104. Specifically, unlike Step S50 described in the first embodiment, the control device 400 performs power generation by the fuel cell 104 by driving the hydrogen pump 184 and the water pump 174 as the auxiliary machines in addition to the air compressor 136 using the power generated by the fuel cell 104. After finishing Step S36, the control device 400 performs Step S52 in the same manner as the first embodiment. In Step S60, the control device 400 ends the interruption control by switching the system main relay 195 of the secondary cell unit 190 to ON, proceeds to the continuity control, and ends this flow.

In the fuel cell system 10 of the present embodiment, if the remaining capacity of the secondary cell 194 is less than or equal to a predetermined threshold value, the control device 400 executes the interruption control after starting the fuel cell 104 using the power of the secondary cell 194 and drives, using the power generated by the fuel cell 104, the auxiliary machines for making the fuel cell 104 generate power. When the SOC of the secondary cell 194 is low, the power of the secondary cell 194 is used only for starting the auxiliary machines which are used for power generation by the fuel cell 104 and the power of the secondary cell 194 is not used for subsequent driving of the auxiliary machines. This makes it possible to reduce or curb the consumption of the power of the secondary cell 194 during the interruption control and allows the user to obtain an output higher than the output of the secondary cell 194 even when the SOC of the secondary cell 194 is low.

C. Other Embodiments (C1) As an example of the interruption control, the above-mentioned first embodiment deals with an example in which the switching transistor TR2 of the secondary cell step-up converter 140 is turned off, and the above-mentioned second embodiment deals with an example in which the system main relay 195 is turned off. Alternatively, for example, other switching elements may be provided in the secondary cell unit 190, the branch unit 160, the DC-DC converter unit 140, and the intelligent power module unit 130, and an electrical connection between the secondary cell 194 and the fuel cell system 10 may be interrupted by the on-off control of the other switching elements. Moreover, the switching element is not limited to the transistor; various switching elements such as a diode, a thyristor, an IGBT, and a MOSFET may be used.

The present disclosure is not limited to the embodiments described above and is able to be realized with various configurations without departing from the spirit thereof. For example, technical features in the embodiments are able to be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized with embodiments which will be described below.

(1) According to one aspect of the present disclosure, a fuel cell system is provided. The fuel cell system includes: a fuel cell; a fuel cell step-up converter having an input terminal, wherein the input terminal is connected to the fuel cell; a secondary cell; a secondary cell step-up converter having an input terminal an output terminal, wherein the input terminal is connected to the secondary cell. wherein the output terminal is connected to an output terminal of the fuel cell step-up converter; and a control device configured to control at least the fuel cell step-up converter and the secondary cell step-up converter to control the fuel cell system, wherein, the control device executes interruption control when the control device executes continuity control and an output of the fuel cell system is requested to be greater than an output of the secondary cell in the continuity control, wherein the continuity control is a control to control the secondary cell step-up converter to output an input voltage from the secondary cell without stepping up the input voltage, wherein the interruption control is a control to interrupt an electrical connection between the fuel cell system and the secondary cell. In the fuel cell system of this aspect, during the continuity control, by executing the interruption control by which an electrical connection between the secondary cell and the fuel cell system is interrupted, it is possible to step up the output voltage from the fuel cell to an output voltage higher than the output voltage of the secondary cell in the continuity control in which the interruption control is not executed. This makes it possible for a user to obtain a desired output even when an output requested by the user is higher than the output of the secondary cell during the execution of the continuity control.

(2) In the fuel cell system of the above-mentioned aspect, the control device does not have to execute the interruption control when a remaining capacity of the secondary cell is less than or equal to a predetermined threshold value. In the fuel cell system of this aspect, when the remaining capacity of the secondary cell is low, by giving a higher priority to the continuity control than to output of a high voltage by the interruption control, it is possible to reduce the possibility that the secondary cell breaks down or prevent the secondary cell from breaking down.

(3) In the fuel cell system of the above-mentioned aspect, in the interruption control, the control device may execute OFF control of a switching element of the secondary cell step-up converter, wherein the OFF control is to interrupt an electrical connection between the fuel cell system and the secondary cell. In the fuel cell system of this aspect, it is possible to execute the interruption control by simple control using an existing configuration of the secondary cell step-up converter.

(4) In the fuel cell system of the above-mentioned aspect, the control device may drive an auxiliary machine with using power generated by the fuel cell when a remaining capacity of the secondary cell is less than or equal to a predetermined threshold value, wherein the auxiliary machine is a machine to start the fuel cell generating power. In the fuel cell system of this aspect, when the remaining capacity of the secondary cell is low, the power of the secondary cell is not used for driving the auxiliary machine which is used for power generation by the fuel cell. This makes it possible to reduce or curb the consumption of the power of the secondary cell during the execution of the interruption control and allows the user to obtain an output higher than the output of the secondary cell even when the remaining capacity of the secondary cell is low.

The present disclosure may be realized as various aspects other than that mentioned above; for example, the present disclosure may be realized as aspects such as a vehicle in which the fuel cell system is installed, a method for controlling the fuel cell system, a method for stepping up the output voltage of the fuel cell during the continuity control, a computer program for implementing these methods, and a storage medium in which this computer program is stored.

What is claimed is:
1. A fuel cell system comprising:
a fuel cell;
a fuel cell step-up converter having an input terminal, wherein the input terminal is connected to the fuel cell;
a secondary cell;
a secondary cell step-up converter having an input terminal an output terminal, wherein the input terminal is connected to the secondary cell, wherein the output terminal is connected to an output terminal of the fuel cell step-up converter; and a control device configured to control at least the fuel cell step-up converter and the secondary cell step-up converter to control the fuel cell system, wherein, the control device executes interruption control when the control device executes continuity control and an output of the fuel cell system is requested to be greater than an output of the secondary cell in the continuity control, wherein the continuity control is a control to control the secondary cell step-up converter to output an input voltage from the secondary cell without stepping up the input voltage, wherein the interruption control is a control to interrupt an electrical connection between the fuel cell system and the secondary cell.

2. The fuel cell system according to claim 1, wherein, the control device does not execute the interruption control when a remaining capacity of the secondary cell is less than or equal to a predetermined threshold value.

3. The fuel cell system according to claim 1, wherein, in the interruption control, the control device executes OFF control of a switching element of the secondary cell step-up converter, wherein the OFF control is to interrupt an electrical connection between the fuel cell system and the secondary cell.

4. The fuel cell system according to claim 1, wherein, the control device drives an auxiliary machine with using power generated by the fuel cell when a remaining capacity of the secondary cell is less than or equal to a predetermined threshold value, wherein the auxiliary machine is a machine to start the fuel cell generating power.

5. A method for controlling a fuel cell system, wherein, interrupting an electrical connection between the fuel cell system and the secondary cell when continuity control is executed and an output of the fuel cell system is requested to be greater than an output of the secondary cell in the continuity control, wherein the continuity control is a control to control a secondary cell step-up converter to output an input voltage from a secondary cell without stepping up the input voltage, and stepping up an input voltage from a fuel cell with using a fuel cell step-up converter.

* * * * *